United States Patent
Huo et al.

(10) Patent No.: US 12,235,527 B2
(45) Date of Patent: Feb. 25, 2025

(54) DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Peirong Huo, Beijing (CN); Lei Yao, Beijing (CN); Xiaogang Zhu, Beijing (CN); Jingyi Xu, Beijing (CN); Bo Li, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/909,442

(22) PCT Filed: Nov. 19, 2021

(86) PCT No.: PCT/CN2021/131816
§ 371 (c)(1),
(2) Date: Sep. 6, 2022

(87) PCT Pub. No.: WO2022/237113
PCT Pub. Date: Nov. 17, 2022

(65) Prior Publication Data
US 2024/0192534 A1    Jun. 13, 2024

(30) Foreign Application Priority Data
May 13, 2021 (CN) .......................... 202110524406.X

(51) Int. Cl.
*G02F 1/133* (2006.01)
*G02F 1/1333* (2006.01)

(52) U.S. Cl.
CPC .... *G02F 1/13306* (2013.01); *G02F 1/133345* (2013.01)

(58) Field of Classification Search
CPC ........... G02F 1/13306; G02F 1/133345; G02F 1/136213; G02F 1/1343; G02F 1/133553;
(Continued)

(56) References Cited

U.S. PATENT DOCUMENTS

2015/0060973 A1\* 3/2015 Tsai ................... G02F 1/136213
257/309
2015/0316823 A1   11/2015 Hao
(Continued)

FOREIGN PATENT DOCUMENTS

CN    103353695 A    10/2013
CN    103605244 A    2/2014
(Continued)

OTHER PUBLICATIONS

International Search Report for PCT/CN2021/131816 Mailed Feb. 23, 2022.

*Primary Examiner* — Mariam Qureshi
(74) *Attorney, Agent, or Firm* — Ling Wu; Stephen Yang; Ling and Yang Intellectual Property

(57) ABSTRACT

A display device includes a substrate and a first common electrode layer, a pixel electrode layer and a second common electrode layer which are stacked on the substrate in turn; wherein an orthographic projection of the first common electrode layer on the substrate is at least partially overlapped with an orthographic projection of the pixel electrode layer on the substrate, and a first storage capacitor is formed on an overlapping portion of the first common electrode layer and the pixel electrode layer; an orthographic projection of the second common electrode layer on the substrate is at least partially overlapped with the orthographic projection of the pixel electrode layer on the substrate, and a (Continued)

second storage capacitor is formed on an overlapping portion of the second common electrode layer and the pixel electrode layer.

12 Claims, 5 Drawing Sheets

(58) Field of Classification Search
CPC ......... G02F 1/134318; G02F 1/134372; G02F 1/157
See application file for complete search history.

(56) References Cited

U.S. PATENT DOCUMENTS

| | | | |
|---|---|---|---|
| 2016/0070143 | A1 | 3/2016 | Jiang |
| 2017/0227803 | A1 | 8/2017 | Chen et al. |
| 2020/0041851 | A1* | 2/2020 | Qi .................. G02F 1/1368 |
| 2021/0407354 | A1 | 12/2021 | Zhang et al. |

FOREIGN PATENT DOCUMENTS

| | | | |
|---|---|---|---|
| CN | 105116642 A | 12/2015 | |
| CN | 109164655 A | 1/2019 | |
| CN | 113109973 A | 7/2021 | |

\* cited by examiner

DISPLAY DEVICE

CROSS-REFERENCE TO RELATED APPLICATIONS

This application is a national stage application of PCT Application No. PCT/CN2021/131816, which is filed on Nov. 19, 2021 and claims priority to the Chinese Patent Application No. 202110524406.X, entitled "DISPLAY DEVICE", filed to the China National Intellectual Property Administration (CNIPA) on May 13, 2021, the content of which should be regarded as being incorporated herein by reference.

TECHNICAL FIELD

Embodiments of the present disclosure relate to, but are not limited to, the display technical field, and more particularly, to a display device.

BACKGROUND

At present, Liquid Crystal Displays (LCD's) are common flat panel display, in which Thin Film Transistor-Liquid Crystal Displays (TFT-LCD's) become the majority of the LCDs. The TFT-LCDs have advantages of thin volume, light weight, excellent picture quality, low power consumption, long service life, digitalization, no radiation, etc., which make the TFT-LCDs widely used in electronic products in various large, medium and small sizes.

With continuous development of the liquid crystal displays, VR products are increasingly favored by consumers. Main form of the VR products is a wearable. In order to achieve thinness, high-definition and other qualities, VR screens are required to achieve technical effects such as high Pixels Per Inch (PPI), fast response and high refresh rate. The achievement of these technical effects requires extremely small pixel pitches of the VR products, which leads to insufficient pixel storage capacitor, resulting in poor display.

SUMMARY

The following is a summary of subject matters described herein in detail. The summary is not intended to limit the protection scope of claims.

A display device according to an embodiment of the present disclosure includes a substrate and a first common electrode layer, a pixel electrode layer and a second common electrode layer which are stacked on the substrate in turn. An orthographic projection of the first common electrode layer on the substrate is at least partially overlapped with an orthographic projection of the pixel electrode layer on the substrate, and a first storage capacitor is formed on an overlapping portion of the first common electrode layer and the pixel electrode layer. An orthographic projection of the second common electrode layer on the substrate is at least partially overlapped with the orthographic projection of the pixel electrode layer on the substrate, and a second storage capacitor is formed on an overlapping portion of the second common electrode layer and the pixel electrode layer.

In an exemplary implementation, the first common electrode layer is electrically connected with the second common electrode layer.

In an exemplary implementation, wherein an insulating structure layer is stacked between the first common electrode layer and the second common electrode layer, a via hole is provided in the insulating structure layer to communicate the first common electrode layer with the second common electrode layer, and the first common electrode layer and the second common electrode layer are electrically connected through the via hole.

In an exemplary implementation, the insulating structure layer includes a first insulating layer that is stacked between the first common electrode layer and the pixel electrode layer.

In an exemplary implementation, the insulating structure layer includes a second insulating layer that is stacked between the second common electrode layer and the pixel electrode layer.

In an exemplary implementation, both of the first common electrode layer and the second common electrode layer are transparent electrodes.

In an exemplary implementation, the orthographic projection of the first common electrode layer on the base substrate completely covers the orthographic projection of the pixel electrode layer on the base substrate; and/or the orthographic projection of the second common electrode layer on the base substrate completely covers the orthographic projection of the pixel electrode layer on the base substrate.

In an exemplary implementation, the base substrate includes a display region, and the orthographic projection of the first common electrode layer on the base substrate completely covers the orthographic projection of the pixel electrode layer on the base substrate; and/or the orthographic projection of the second common electrode layer on the base substrate completely covers the display region.

In an exemplary implementation, the base substrate includes a display region, and the display region includes an open region and a non-open region, the first common electrode layer includes a plurality of first sub-common electrodes arranged at intervals, each of the first sub-common electrodes corresponds to at least one open region respectively, an orthographic projection of the first sub-common electrode on the base substrate completely cover at least one open region corresponding to the first sub-common electrode, and an orthographic projection of a spacing between adjacent first sub-common electrodes on the base substrate is located in the non-open region; and/or, the second common electrode layer includes a plurality of second sub-common electrodes arranged at intervals, each of the second sub-common electrodes is respectively corresponding to at least one open region, an orthographic projection of the second sub-common electrode on the base substrate completely covers at least one open region corresponding to the second sub-common electrode, and an orthographic projection of a spacing between adjacent second sub-common electrodes on the base substrate is located in the non-open region.

In an exemplary implementation, the base substrate comprises a display region, and the display region comprises an open region and a non-open region, the first common electrode layer comprises a plurality of first sub-common electrodes, each of the first sub-common electrodes corresponds to at least one open region respectively, an orthographic projection of the first sub-common electrode on the base substrate completely cover at least one open region corresponding to the first sub-common electrode, adjacent first sub-common electrodes are electrically connected by a first connector, and an orthographic projection of the first connector on the base substrate is located in the non-open region; and/or the second common electrode layer comprises a plurality of second sub-common electrodes, each of the second sub-common electrodes is respectively corresponding to at least one open region, an orthographic projection of the second sub-common electrodes on the base substrate completely covers at least one open region corresponding to the second sub-common electrode, adjacent second sub-common electrodes are electrically connected by a second connector, and an orthographic projection of the second connector on the base substrate is located in the non-open region.

In an exemplary implementation, a first conductive layer in parallel with the first common electrode layer is further included; and/or, a second conductive layer in parallel with the second common electrode layer is further included.

Other aspects may be comprehended upon reading and understanding drawings and detailed descriptions.

DETAILED DESCRIPTION

Figure 1:
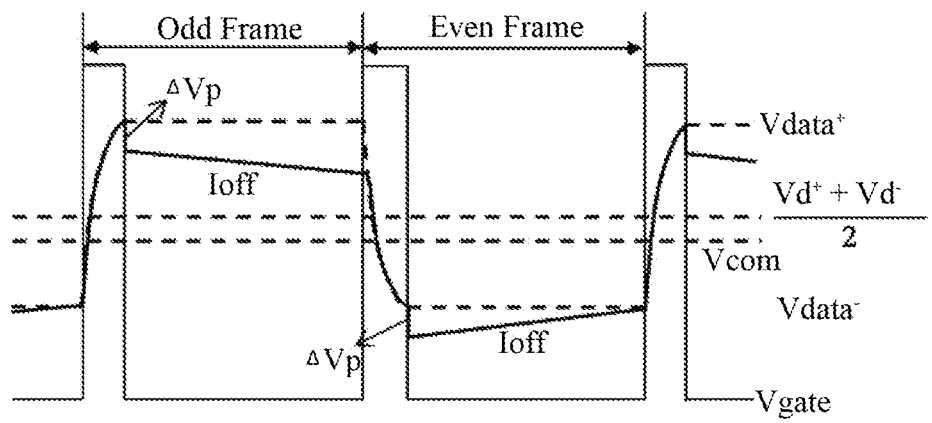
FIG. 1 is a schematic diagram of when flicker occurs in a display device.

The embodiments of the present disclosure will be described in detail below with reference to the drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the constituent elements. Therefore, appropriate replacements can be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the present disclosure, "about" refers to that a boundary is defined not so strictly and numerical values within process and measurement error ranges are allowed.

At present, liquid crystal display devices with high Pixels Per Inch (PPI), such as Virtual Reality (VR) display devices with Pixels Per Inch (PPI)≥1200, have extremely small pixel pitches on screens, which leads to insufficient pixel storage capacitor, resulting in a problem of poor display such as flicker.

A principle of the flicker is a visual flicker phenomenon caused by a brightness difference between LCD frames. The brightness difference is calculated by voltage signals which are photoelectrically converted from brightness of two adjacent frames. Vmax−Vmin is an AC component, (Vmax−Vmin)/2 is a DC component, and a ratio of them defines flicker, and a general standard of the flicker is <10%. The flicker can have a flicker effect on human eyes. When actual VR products are in use, consumers feel obvious vertical lines when shaking their heads.

FIG. 1 is a schematic diagram of flicker on a display device. As shown in FIG. 1, during a display process of a liquid crystal display device, a voltage of a pixel electrode is affected by a coupling voltage $\Delta Vp$ when a gate is closed and a cut-off current Ioff when a pixel is held. In addition, due to existence of differences between pixels within the display device, adjusting the common electrode voltage Vcom cannot balance pixel voltages between frames, which results in flicker. Homogeneity of $\Delta Vp$ is defined as $\Omega$, and $\Omega$ is calculated as follows:

$$\Omega = \Delta Vp_{max} - \Delta Vp_{min}$$
$$= \frac{Cgs_{on} \times (VGH - VGL)}{Cgs_{on} + Clc_\perp + Cst} - \frac{Cgs_{on} \times (VGH - VGL)}{Cgs_{on} + Clc_\parallel + Cst}$$

Wherein, VGH is gate-line high voltage, VGL is gate-line low voltage, Clc is liquid crystal capacitance, Cst is storage capacitance, and Cgs is gate-source capacitance.

Pixel storage capacitor in the liquid crystal display device has an effect on a liquid crystal retention ability. After pixels are charged, the display of a LCD screen depends on the pixel storage capacitor during a later frame, so the pixel storage capacitor plays a vital role in the display of the liquid crystal display device. Liquid crystal display is achieved by rotation of a liquid crystal in a certain angle, which is formed by pixel switching on, pixel charging, voltage driving of the liquid crystal, and passing of backlight through the liquid crystal. A liquid crystal rotation angle is determined by a driving voltage of the liquid crystal, and the liquid crystal rotation angle directly determines the brightness of the liquid crystal screen. After the pixel is charged and the pixel switch is switched off, the liquid crystal rotation angle is retained according to the pixel storage capacitor, which can be simply understood as the retention of the brightness of the liquid crystal screen is determined by a size of the pixel storage capacitor.

The pixel storage capacitor is a parallel plate capacitor, and an area of a capacitor electrode plate is determined by the pixel electrode. The electrode plate of the pixel storage capacitor is often referred to as a common electrode and a pixel electrode, and a dielectric layer of the capacitor is an insulating layer, such as a passivation layer.

A calculation formula of pixel storage capacitance is $C=\varepsilon S/4\pi kd$. S is the area of capacitor electrode plate, the smaller the area, the smaller the capacitance. For high PPI of the VR products, extremely small pixel size is needed. Therefore, small pixel storage capacitance has become a shortcoming of the VR products. Insufficient pixel storage capacitance has become a technical bottleneck in the pursuit of PPI improvement of the VR products, and a series of display problems caused by the insufficient pixel storage capacitance have become difficult problems hindering the development of VR products.

Figure 2:
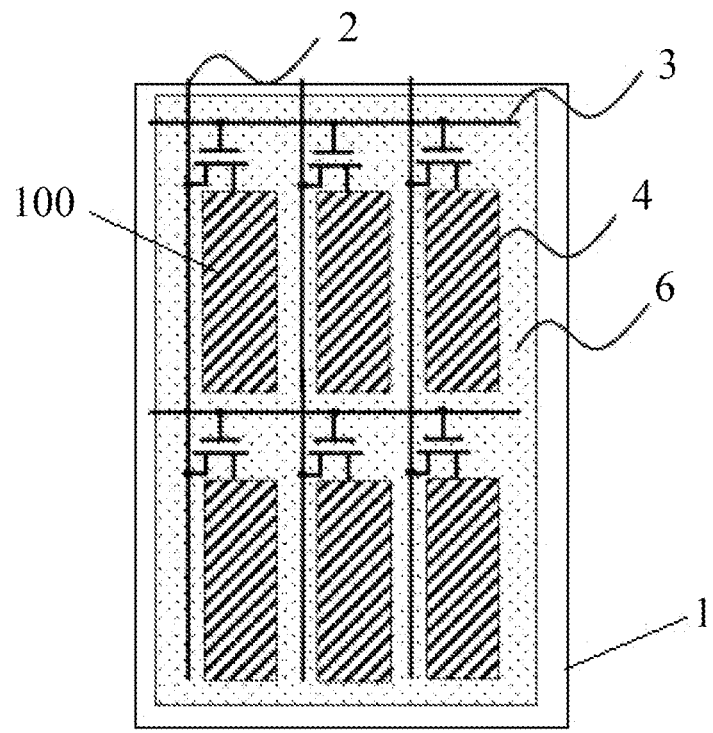
FIG. 2 is a schematic diagram of a structure of a display device.
Figure 3:
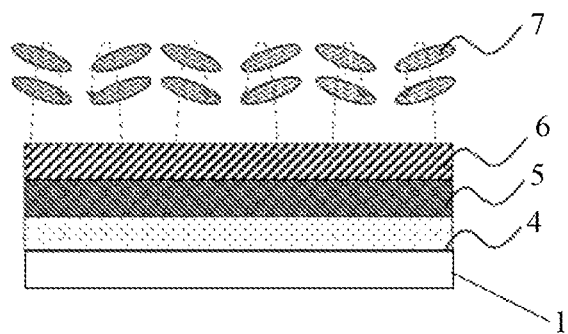
FIG. 3 is a cross-sectional view of a display device.

FIG. 2 is a schematic diagram of a structure of a display device. FIG. 3 is a cross-sectional view of a display device. For illustration, a cross-sectional view of an open region of one pixel region of the display device in FIG. 3 is taken as an example. As shown in FIGS. 2 and 3, a display device includes a base substrate 1 and a plurality of data lines 2 extending in a first direction and a plurality of gate lines 3 extending in a second direction, wherein the data lines 2 and the gate lines 3 define a plurality of pixel regions 100 on the base substrate 1. The pixel region 100 includes an open region and a non-open region. A thin film transistor is provided on the non-open region of the base substrate 1, and a common electrode and a pixel electrode are provided on the open region of the base substrate 1.

As shown in FIG. 3, a pixel electrode layer 4, a passivation layer 5, a common electrode layer 6, and a liquid crystal layer 7 are sequentially stacked on the open region of the pixel region 100, and the pixel electrode layer 4 is disposed opposite to the common electrode layer 6 to form a storage capacitor for a pixel.

Figure 4:
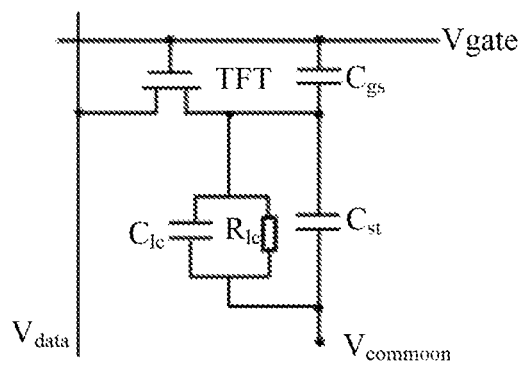
FIG. 4 is an equivalent circuit diagram of a display device.

FIG. 4 is an equivalent circuit diagram of a display device. As shown in FIG. 4, a common electrode layer in a storage capacitor Cst is applied with a common electrode voltage Vcommon, and a pixel electrode layer in the storage capacitor Cst is applied with a data line voltage Vdata, thereby achieving the storage of charges in the storage capacitor Cst.

However, small area of the pixel electrode in the pixel electrode layer of the liquid crystal display device with high Pixels Per Inch (PPI) leads to insufficient storage capacitance, a problem of poor display such as flicker arise in the liquid crystal display device.

A display device according to an embodiment of the present disclosure includes a substrate and a first common electrode layer, a pixel electrode layer and a second common electrode layer which are stacked on the substrate in turn. An orthographic projection of the first common electrode layer on the substrate is at least partially overlapped with an orthographic projection of the pixel electrode layer on the substrate, and a first storage capacitor is formed on an overlapping portion of the first common electrode layer and the pixel electrode layer. An orthographic projection of the second common electrode layer on the substrate is at least partially overlapped with the orthographic projection of the pixel electrode layer on the substrate, and a second storage capacitor is formed on an overlapping portion of the second common electrode layer and the pixel electrode layer.

Figure 5:
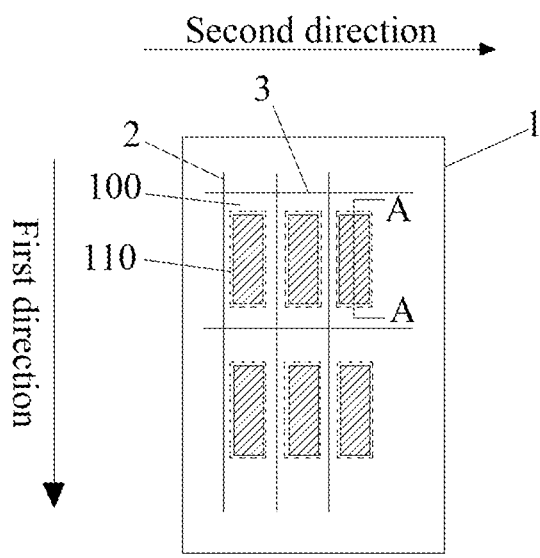
FIG. 5 is a top view of a display device provided according to an embodiment of the present disclosure.

FIG. 5 is a top view of a display device provided according to an embodiment of the present disclosure. As shown in FIG. 5, the display device according to the embodiment of the present disclosure may be an array substrate. A display device according to an embodiment of the present disclosure includes a base substrate 1 and a plurality of data lines 2 extending in a first direction and a plurality of gate lines 3 extending in a second direction provided on the base substrate 1. The base substrate 1 includes a display region and a frame region surrounding the display region. The data lines 2 and the gate lines 3 define at least one pixel region 100 on the display region of the base substrate 1. At least one pixel region 100 is arranged on the base substrate 1. The pixel region 100 is provided with a thin film transistor, a first common electrode layer, a pixel electrode layer and a second common electrode layer. Each pixel region 100 may be divided into an open region 110 and a non-open region. The display device according to the embodiment of the present disclosure can be disposed opposite to a color film substrate, and a black matrix is provided on a region of the color film substrate corresponding to a non-open region of the display device. There is no black matrix in a region of the color film substrate corresponding to the open region 110 of the display device, and light can pass through the open region 110. The thin film transistor is disposed on the non-open region of the pixel region 100, and includes at least a gate, a source, a drain and an active layer. The first common electrode layer 8, the pixel electrode layer 4, and the second common electrode layer 9 are disposed on the open region 110 of the pixel region 100. Herein, the first direction is different from the second direction. For example, the first direction is perpendicular to the second direction.

Figure 6:
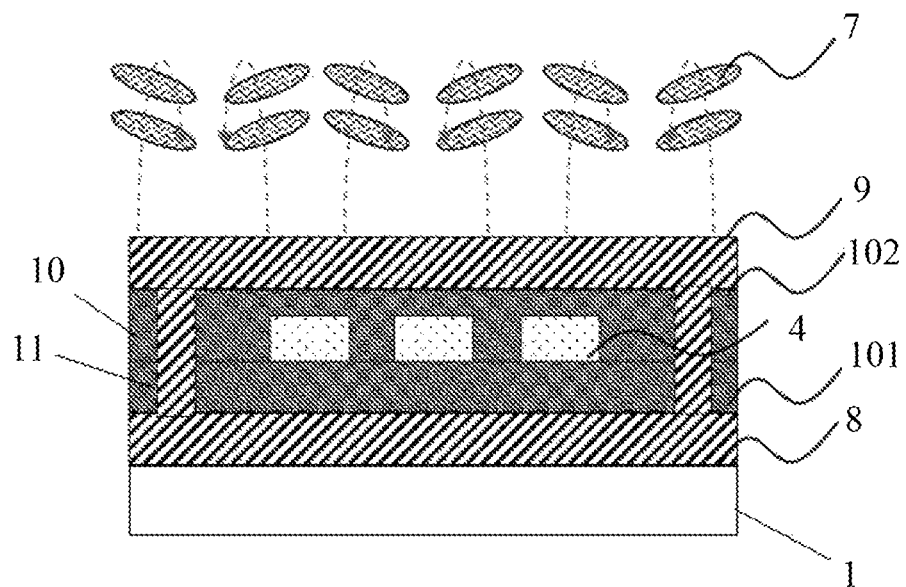
FIG. 6 is a cross-sectional view of a display device provided according to an embodiment of the present disclosure.

FIG. 6 is a cross-sectional view of a display device provided according to an embodiment of the present disclosure. For illustration, a case that FIG. 6 is a sectional view along an A-A direction in FIG. 5 is taken as an example. As shown in FIG. 6, a display device according to an embodiment of the present disclosure includes a base substrate 1, and a first common electrode layer 8, a pixel electrode layer 4 and a second common electrode layer 9 which are stacked on the open region of the base substrate 1 in turn. An orthographic projection of the first common electrode layer 8 on the base substrate 1 is at least partially overlapped with an orthographic projection of the pixel electrode layer 4 on the base substrate 1. A first storage capacitor is formed on the overlapping portion of the first common electrode layer 8 and the pixel electrode layer 4, and the first storage capacitor is capable of storing electric charges to maintain a rotation angle of the liquid crystal. An orthographic projection of the second common electrode layer 9 on the base substrate 1 is at least partially overlapped with an orthographic projection of the pixel electrode layer 4 on the base substrate 1. A second storage capacitor is formed on the overlapping portion of the second common electrode layer 9 and the pixel electrode layer 4, and the second storage capacitor is capable of storing electric charges to maintain a rotation angle of the liquid crystal.

According to the display device in the embodiment of the present disclosure, the first storage capacitor is formed by the first common electrode layer 8 and the pixel electrode layer 4, and the second storage capacitor is formed by the second common electrode layer 9 and the pixel electrode layer 4, thereby increasing the storage capacitance of the pixel of the display device, improving the liquid crystal retention ability, and solving the problem of poor display such as flicker caused by insufficient storage capacitance.

In an exemplary implementation, both of the first common electrode layer 8 and the second common electrode layer 9 may be located in the open region, or most of the first common electrode layer 8 and the second common electrode layer 9 may be located in the open region of the base substrate 1, and an edge portion of the first common electrode layer 8 and the second common electrode layer 9 may be located in the non-open region of the base substrate 1.

In an exemplary implementation, the first common electrode layer 8 is electrically connected to the second common electrode layer 9, the first common electrode layer 8 and the second common electrode layer 9 have a common potential, and the first storage capacitance and the second storage capacitance form a parallel capacitance, so that the storage capacitance of the display device is expanded, the liquid crystal retention capability of the is improved, and the poor display quality caused by the poor retention capability of the liquid crystal due to the small storage capacitance is improved.

In an exemplary implementation, an insulating structure layer 10 is stacked between the first common electrode layer 8 and the second common electrode layer 9. The insulating structure layer 10 may be located between the first common electrode layer 8 and the pixel electrode layer 4, and between the second common electrode layer 9 and the pixel electrode layer 4. The insulating structure layer 10 can serve as a dielectric layer of the first storage capacitor and a dielectric layer of the second storage capacitor, respectively. The first common electrode layer 8 and the second common electrode layer 9 are located, respectively, on opposite sides of the insulating structure layer 10. The insulating structure layer 10 is provided with a via hole 11 for communicating the first common electrode layer 8 with the second common electrode layer 9, and the first common electrode layer 8 are electrically connected with the second common electrode layer 9 through the via hole 11.

In an exemplary implementation, the insulating structure layer 10 may include a first insulating layer 101 stacked between the first common electrode layer 8 and the pixel electrode layer 4, and the first insulating layer 101 separates the first common electrode layer 8 from the pixel electrode layer 4, as a dielectric layer of the first storage capacitor.

In an exemplary implementation, the insulating structure layer 10 may include a second insulating layer 102 stacked between the second common electrode layer 9 and the pixel electrode layer 4, and the second insulating layer 102 separates the second common electrode layer 9 from the pixel electrode layer 4, as a dielectric layer of the second storage capacitor.

In an exemplary embodiment, both of the first common electrode layer 8 and the second common electrode layer 9 are disposed in the open region of the base substrate 1, and both of the first common electrode layer 8 and the second common electrode layer 9 are transparent electrodes, so that backlight rays can be irradiated to the liquid crystal layer through the first common electrode layer 8 and the second common electrode layer 9. Wherein, the first common electrode layer 8 and the second common electrode layer 9 may be made of Indium Tin Oxide (ITO).

In an exemplary implementation, the orthographic projection of the first common electrode layer 8 on the base substrate 1 completely covers the orthographic projection of the pixel electrode layer 4 on the base substrate 1, so that each pixel electrode in the pixel electrode layer 4 forms a first storage capacitance with the first common electrode layer 8, increasing the first storage capacitance; and/or, the orthographic projection of the second common electrode layer 9 on the base substrate 1 completely covers the orthographic projection of the pixel electrode layer 4 on the base substrate 1, so that each pixel electrode in the pixel electrode layer 4 forms a second storage capacitance with the second common electrode layer 9, increasing the second storage capacitance.

Figure 7:
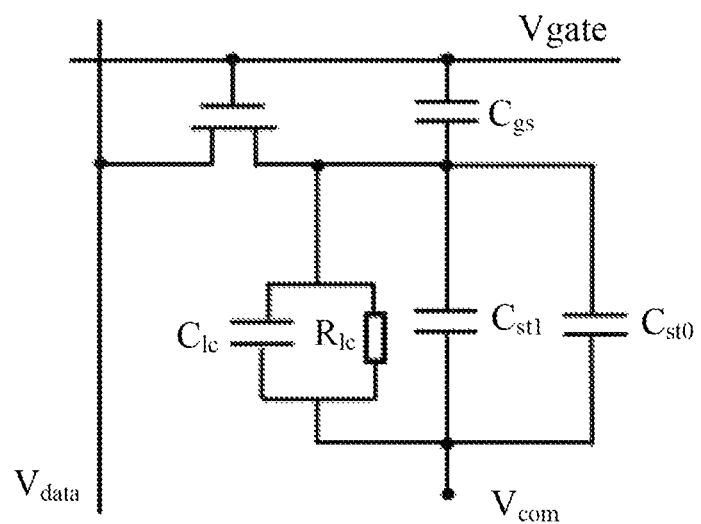
FIG. 7 is an equivalent circuit diagram of a display device provided according to an embodiment of the present disclosure.

FIG. 7 is an equivalent circuit diagram of a display device provided according to an embodiment of the present disclosure. As shown in FIG. 7, the first storage capacitance $Cst0$ and the second storage capacitance $Cst1$ form a parallel capacitance, so that the pixel storage capacitor of the display device is expanded, which is equivalent to the electrode plate area of the parallel plate capacitor is increased by 2 times in theory. In fact, due to the existence of edge electric fields between the common electrode layer and the pixel electrode layer in the via hole, $Cst0 > Cst1$.

Figure 8:
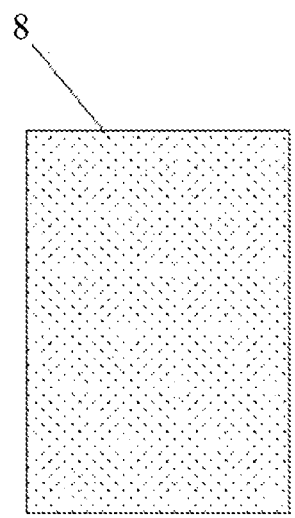
FIG. 8 is a first schematic view of a structure of a first common electrode layer in a display device provided according to an embodiment of the present disclosure.

FIG. 8 is a first schematic view of a structure of a first common electrode layer in a display device provided according to an embodiment of the present disclosure. In an exemplary implementation, as shown in FIG. 8, the base substrate includes a display region, the first common electrode layer 8 is a monolithic electrode layer, and an orthographic projection of the first common electrode layer 8 on the base substrate completely covers the display region.

In an exemplary implementation, the base substrate includes a display region, the second common electrode layer may be a monolithic electrode layer, and an orthographic projection of the second common electrode layer on the base substrate completely covers the display region.

Figure 9:
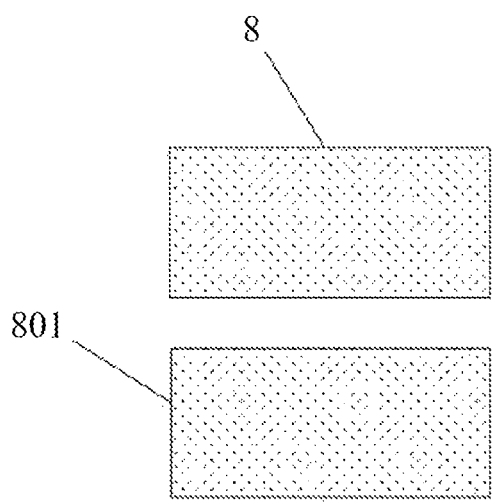
FIG. 9 is a second schematic view of a structure of a first common electrode layer in a display device provided according to an embodiment of the present disclosure.

FIG. 9 is a second schematic view of a structure of a first common electrode layer in a display device provided according to an embodiment of the present disclosure. In an exemplary implementation, as shown in FIG. 9, the base substrate includes a display region including an open region and a non-open region, and the first common electrode layer 8 includes a plurality of first sub-common electrodes 801 arranged at intervals, each of the first sub-common electrodes 801 corresponds, respectively, to at least one open region, that is, one first sub-common electrodes 801 corresponds to at least one open region. An orthographic projection of the first sub-common electrodes 801 on the base substrate completely cover at least one open region corresponding to the first sub-common electrodes 801, and an orthographic projection of a spacing between adjacent first sub-common electrodes 801 on the base substrate is located in the non-open region, that is, the adjacent first sub-common electrodes 801 are disconnected at the non-open region.

In an exemplary implementation, the base substrate includes a display region including an open region and a non-open region, and the second common electrode layer includes a plurality of second sub-common electrodes arranged at intervals, each of the second sub-common electrodes corresponds, respectively, to at least one open region, that is, one second sub-common electrodes corresponds to at least one open region. An orthographic projection of the second sub-common electrodes on the base substrate completely cover at least one open region corresponding to the first sub-common electrodes 801, and an orthographic projection of a spacing between adjacent second sub-common electrodes on the base substrate is located in the non-open region, that is, the adjacent second sub-common electrodes are disconnected at the non-open region.

Figure 10:
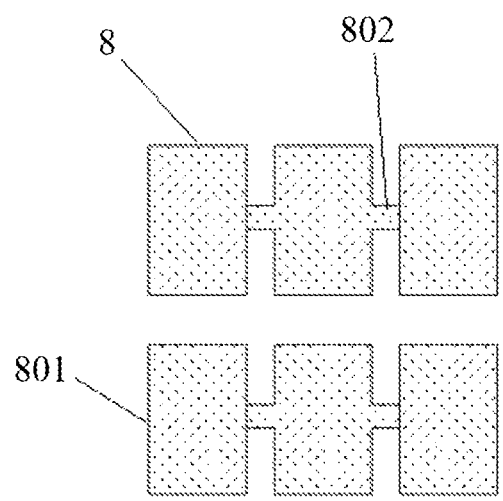
FIG. 10 is a third schematic view of a structure of a first common electrode layer in a display device provided according to an embodiment of the present disclosure.

FIG. 10 is a third schematic view of a structure of a first common electrode layer in a display device provided according to an embodiment of the present disclosure. In an exemplary implementation, as shown in FIG. 10, the base substrate includes a display region including an open region and a non-open region, and the first common electrode layer 8 includes a first sub-common electrode 801, each first sub-common electrode 801 corresponds, respectively, to at least one open region, that is, one first sub-common electrodes 801 corresponds to at least one open region. An orthographic projection of the first sub-common electrodes 801 on the base substrate completely cover at least one open region corresponding to the first sub-common electrodes 801, adjacent first sub-common electrodes 801 are electrically connected by a first connector 802, and an orthographic projection of the first connector 802 on the base substrate is located in the non-open region, that is, the adjacent first sub-common electrodes 801 are electrically connected by the first connector 802 at the non-open region.

In an exemplary implementation, the base substrate includes a display region including an open region and a non-open region, and the second common electrode layer includes a plurality of second sub-common electrodes, each of the second sub-common electrodes corresponds, respectively, to at least one open region, that is, one second sub-common electrodes corresponds to at least one open region. An orthographic projection of the second sub-common electrodes on the base substrate completely cover at least one open region corresponding to the first sub-common electrodes 801, adjacent second common electrodes are electrically connected by a second connector, and an orthographic projection of the second connector on the base substrate is located in the non-open region, that is, the adjacent second sub-common electrodes are connected at the non-open region by the second connector.

In some embodiments, the first common electrode layer and the second common electrode layer according to the embodiments of the present disclosure may also be of other shapes as long as the orthographic projection of the first common electrode layer and the second common electrode layer on the base substrate and an orthographic projection of the pixel electrode layer on the substrate overlap, which will not repeated in the embodiment of the present disclosure.

In an exemplary implementation, the display device according to the embodiments of the present disclosure further includes a first conductive layer, the first conductive layer is connected in parallel with the first common electrode layer, and the first conductive layer can improve the uniformity of the first common electrode layer and reduce the resistance of the first common electrode layer.

In an exemplary implementation, the display device according to the embodiments of the present disclosure further includes a second conductive layer, the second conductive layer is connected in parallel with the second common electrode layer, and the second conductive layer can improve the uniformity of the second common electrode layer and reduce the resistance of the second common electrode layer.

In an exemplary implementation, as shown in FIG. 6, the display device according to the embodiments of the present disclosure further includes a liquid crystal layer 7 that is stacked on a side of the second common electrode layer 9 away from the pixel electrode layer 4.

The display device according to the embodiments of the present disclosure can be a display substrate, a liquid crystal display panel; or, terminal products such as televisions, VR display devices, AR display devices, etc.

A method for manufacturing a display device is provided in an embodiment of the present disclosure, which includes:
　　forming a first common electrode layer, a pixel electrode layer and a second common electrode layer in turn on a base substrate;
　　enabling an orthographic projection of the first common electrode layer on the substrate at least partially overlapped with an orthographic projection of the pixel electrode layer on the substrate, and forming a first storage capacitor on an overlapping portion of the first common electrode layer and the pixel electrode layer;
　　enabling an orthographic projection of the second common electrode layer on the substrate at least partially overlapped with the orthographic projection of the pixel electrode layer on the substrate, and forming a second storage capacitor on an overlapping portion of the second common electrode layer and the pixel electrode layer.

In an exemplary implementation, the method for manufacturing the display device according to the embodiment of the present disclosure further includes:
　　electrically connecting the first common electrode layer with the second common electrode layer.

The drawings of the present disclosure only involve structures involved in the present disclosure, and other structures may refer to conventional designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:
1. A display device, comprising a substrate and a first common electrode layer, a pixel electrode layer and a second common electrode layer which are stacked on the substrate in turn; wherein
　　an orthographic projection of the first common electrode layer on the base substrate is at least partially overlapped with an orthographic projection of the pixel electrode layer on the base substrate, and a first storage capacitor is formed on an overlapping portion of the first common electrode layer and the pixel electrode layer; and
　　an orthographic projection of the second common electrode layer on the base substrate is at least partially overlapped with the orthographic projection of the pixel electrode layer on the base substrate, and a second storage capacitor is formed on an overlapping portion of the second common electrode layer and the pixel electrode layer;
　　wherein the base substrate comprises a display region, the display region comprises an open region and a non-open region,
　　the first common electrode layer comprises a plurality of first sub-common electrodes, each of the first sub-common electrodes corresponds to at least one open region respectively, an orthographic projection of the first sub-common electrode on the base substrate completely cover at least one open region corresponding to the first sub-common electrode, adjacent first sub-common electrodes are electrically connected by a first connector, and an orthographic projection of the first connector on the base substrate is located in the non-open region; and the second common electrode layer comprises a plurality of second sub-common electrodes, each of the second sub-common electrodes is respectively corresponding to at least one open region, an orthographic projection of the second sub-common electrodes on the base substrate completely covers at least one open region corresponding to the second sub-common electrode, adjacent second sub-common electrodes are electrically connected by a second connector, and an orthographic projection of the second connector on the base substrate is located in the non-open region.

2. The display device of claim 1, wherein the first common electrode layer and the second common electrode layer are electrically connected.

3. The display device of claim 2, wherein
an insulating structure layer is stacked between the first common electrode layer and the second common electrode layer,
a via hole is provided in the insulating structure layer to communicate the first common electrode layer with the second common electrode layer, and
the first common electrode layer and the second common electrode layer are electrically connected through the via hole.

4. The display device of claim 3, wherein the insulating structure layer comprises a first insulating layer that is stacked between the first common electrode layer and the pixel electrode layer.

5. The display device of claim 3, wherein the insulating structure layer comprises a second insulating layer that is stacked between the second common electrode layer and the pixel electrode layer.

6. The display device of claim 1, wherein both of the first common electrode layer and the second common electrode layer are transparent electrodes.

7. The display device of claim 1, wherein
the orthographic projection of the first common electrode layer on the base substrate completely covers the orthographic projection of the pixel electrode layer on the base substrate.

8. The display device of claim 1, wherein
the base substrate comprises a display region, and the orthographic projection of the first common electrode layer on the base substrate completely covers the orthographic projection of the pixel electrode layer on the base substrate.

9. The display device of claim 1, further comprising a first conductive layer in parallel with the first common electrode layer.

10. The display device of claim 1, wherein the orthographic projection of the second common electrode layer on the base substrate completely covers the orthographic projection of the pixel electrode layer on the base substrate.

11. The display device of claim 1, wherein the orthographic projection of the second common electrode layer on the base substrate completely covers the display region.

12. The display device of claim 1, further comprising a second conductive layer in parallel with the second common electrode layer.

* * * * *